United States Patent
Woo et al.

(10) Patent No.: US 12,310,327 B2
(45) Date of Patent: May 27, 2025

(54) ABSORBENT PET PAD

(71) Applicant: Sarah H Woo, Flushing, NY (US)

(72) Inventors: Sarah H Woo, Flushing, NY (US); Roberto Ammendola, Los Angeles, CA (US)

(73) Assignee: Sarah H. Woo, Flushing, NY (US)

( * ) Notice: Subject to any disclaimer, the term of this patent is extended or adjusted under 35 U.S.C. 154(b) by 407 days.

(21) Appl. No.: 17/745,035

(22) Filed: May 16, 2022

(65) Prior Publication Data

US 2022/0272937 A1 Sep. 1, 2022

Related U.S. Application Data

(63) Continuation-in-part of application No. 17/183,243, filed on Feb. 23, 2021, now abandoned.

(51) Int. Cl.
*A01K 1/01* (2006.01)
*A01K 1/015* (2006.01)
*B32B 3/30* (2006.01)

(52) U.S. Cl.
CPC .......... *A01K 1/0107* (2013.01); *A01K 1/0157* (2013.01)

(58) Field of Classification Search
CPC .. A01K 1/0107; A01K 1/0157; A01K 1/0125; B32B 2471/04; B32B 3/30
See application file for complete search history.

(56) References Cited

U.S. PATENT DOCUMENTS

| | | |
|---|---|---|
| 3,154,052 A | 10/1964 | Sweeney |
| 3,233,502 A * | 2/1966 | Fernberg ............... F16B 21/086 411/500 |
| 3,684,155 A | 8/1972 | Smith |
| 4,014,292 A | 3/1977 | Coughlin et al. |
| 4,305,544 A | 12/1981 | Noonan |
| 4,441,451 A | 4/1984 | Neal |
| 4,501,226 A | 2/1985 | Bienvenu et al. |
| 4,646,685 A | 3/1987 | Arenz |
| 4,800,841 A | 1/1989 | Yananton et al. |
| 5,059,476 A | 10/1991 | Steiniger et al. |
| 5,390,628 A | 2/1995 | Vito |

(Continued)

OTHER PUBLICATIONS

Product literature: Wee-Wee Super Absorbent Pads with Insta-Rise Border. PDF from: https://www.fourpaws.com/all-products/waste-management-and-training/indoor/wee-wee-pads-with-insta-rise-border , retrieved Feb. 23, 2021.

(Continued)

*Primary Examiner* — Joanna Pleszczynska
(74) *Attorney, Agent, or Firm* — Harness, Dickey & Pierce, P.L.C.

(57) ABSTRACT

Disclosed herein in is an absorbent pet pad having erectable edges that define a central region where pet waste in confined. An exemplary embodiment comprises a non-rigid absorbent central region surrounded by edge region. The edge region can be erected to an erected angle, forming a substantially vertical border surrounding the pad. The border serves to retain pet waste, and to urge a pet, instinctively, to locate itself entirely on the pad when expelling waste. The erected angle forming the border may be established and maintained with edge attachment features. The erected edge region may be especially rigid owing to a folded A-shaped cross section.

16 Claims, 8 Drawing Sheets

(56) References Cited

U.S. PATENT DOCUMENTS

| | | | |
|---|---|---|---|
| 5,394,834 A | 3/1995 | Queen et al. | |
| 5,579,722 A | 12/1996 | Yamamoto et al. | |
| 5,797,347 A | 8/1998 | Ochi | |
| 5,832,869 A | 11/1998 | Franczak | |
| 8,697,202 B2* | 4/2014 | Levkovitch | A01K 1/0125 |
| | | | 428/12 |
| 8,960,127 B2 | 2/2015 | Miller | |
| 2002/0002954 A1 | 1/2002 | Goitiandia et al. | |
| 2005/0109284 A1 | 5/2005 | Helfman | |
| 2010/0300367 A1 | 12/2010 | Askinasi | |
| 2012/0234253 A1 | 9/2012 | Malm et al. | |
| 2014/0261208 A1 | 9/2014 | Calimano et al. | |
| 2017/0305596 A1* | 10/2017 | Dag | B65D 5/0015 |

OTHER PUBLICATIONS

Product literature: Wee-Wee Washable Dog Pee Pad. PDF from: https://www.fourpaws.com/all-products/waste-management-and-training/indoor/wee-wee-pads/wee-wee-washables , retrieved Feb. 23, 2021.

Office Action from parent U.S. Appl. No. 17/183,243 dated May 18, 2021.

Office Action from parent U.S. Appl. No. 17/183,243 dated Aug. 25, 2021.

Office Action from parent U.S. Appl. No. 17/183,243 dated Mar. 10, 2022.

* cited by examiner

ABSORBENT PET PAD

CROSS-REFERENCE TO RELATED APPLICATIONS

This application is a continuation in part of and claims priority to and the benefit of U.S. patent application Ser. No. 17/183,243 filed on Feb. 23, 2021 and entitled ABSORBENT PET PAD, the contents of which are expressly incorporated herein by reference.

FIELD

The present invention relates to pet waste management pads. More particularly, the present invention relates to absorbent pet pads used to confine pet waste to the surface of the pad.

BACKGROUND

Traditional pet waste management pads may be used in the household, and other environments where it is desirable to confine the pet waste to the surface of the pad. The pet is urged and trained to use the pad when producing waste. The pads can comprise absorbent material suited to absorb the liquid elements of the pet waste.

Although washable pet waste management pads are available, the most significant commercial demand for pet pads is specifically for disposable pet pads. Disposable pet pads are particularly convenient and sanitary because they are disposed of once they become saturated with pet waste.

Conventional disposable pet pads comprise a flat, non-rigid absorbent material that is foldable and rollable so as to be convenient for storage, for packaging for distribution and sale, and for disposal. Referring to prior art FIG. 1, conventional pet pad 100 is shown deployed in a typical household environment. It will be noted that pet pad 100 is flat across its entire area, owing to the desire that it consist of a flat, non-rigid conveniently storable, packageable and disposable article. This characteristic, however, leads to significant shortcomings. In particular, since the pet pad is entirely flat, pet waste 102 tends to leak off of the area of the pet pad and onto the adjacent household floor. In addition, it is recognized that pets are inclined to position themselves in a confined space while producing waste, when such a space is presented. But because the conventional pet pad is entirely flat with no recognizable three-dimensional border, the pet will not be instinctively urged to position itself on the pad. Instead, the pet may, for example, place its front legs on the pad while waste 104 is produced entirely off the surface of the pad.

What is desirable is a pet pad and method for using a pet pad that has all the advantages of the conventional, easily stored, packaged, and disposed-of pad, and also solves the shortcomings described. Moreover, a pet pad with erectable edge sections that are particularly rigid and sturdy, and configured to be compact when packaged for shipping and storage, is especially desired.

SUMMARY

An exemplary embodiment of the present invention comprises a non-rigid central region comprising an absorbent material. The central region is disposed in a first horizontal plane.

In this exemplary embodiment, an edge region is disposed in the first horizontal plane extending laterally away from the central region. The edge region comprises a plurality of edge sections. The plurality of edge sections are configured to fold away from the first horizontal plane forming an erected angle between 15 degrees and 165 degrees with the first horizontal plane.

In this exemplary embodiment at least one of the edge sections comprises an edge section length and is foldable along the edge section length establishing a double layer edge section when erected.

In another exemplary embodiment, the double layer edge section may have an A-shaped cross section, enhancing rigidity of the edge section when erected.

In another exemplary embodiment the edge sections may comprise protrusions extending perpendicularly upward and downward relative to the horizontal plane. The protrusions add to the rigidity of the double layer edge section when erected. Two protrusions which extend downward may also make contact when the edge section is folded facilitating an A-shaped double layer edge section cross section.

In certain embodiments the edge region may comprise a molded pulp material or similar paper or fiber derivative material which allows for the formation of three-dimensional features and/or hollow protrusions in the surface.

In certain embodiments edge sections may comprise edge attachment features, wherein at least one of the edge attachment features comprises a first tab comprising a first attachment protrusion and an opposing edge attachment feature comprises a second tab comprising an opening shaped to substantially fixedly receive the first attachment protrusion.

In another exemplary embodiment edge sections may comprise alternating waffle shaped protrusions such that, when the pet pad is folded for packaging and shipment the waffle shaped protrusions nest into one another.

BRIEF DESCRIPTION OF DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

So that the manner in which the features and advantages of embodiments of methods and systems of the present invention may be understood in more detail, a more particular description of the present invention briefly summarized above may be had by reference to certain embodiments thereof that are illustrated in the appended drawings, which form a part of this specification. The drawings illustrate only certain embodiments of the present invention and are, therefore, not to be considered limiting of the scope of the present invention which includes other useful and effective embodiments as well.

An exemplary version of the present invention comprises a non-rigid or largely non-rigid flat pad comprising an edge region that can be erected to an erected angle so as to provide standing edges surrounding an absorbent central region. This exemplary embodiment may be stored, packaged for distribution and sale, and disposed of, as a non-rigid or largely non-rigid flat article. And when the pad is deployed, its edges can be erected to support retaining pet waste on the pad, and to provide a three-dimensional border motivating a pet to situate itself entirely on the pad when producing waste.

Various elements of various desirable embodiments of the inventive pet pad may comprise materials of differing rigidity. For the purposes of the present detailed description of the various embodiments of the inventive pet pad, the term non-rigid should be understood to mean a material, that when folded, does not significantly deform in a manner that retains the folded shape. Examples of a non-rigid materials include cotton cloth such as that used for bedsheets, and the sheet material that comprises the disposable pet pad sold under the brand name Wee-Wee® pad. The term semi-rigid should be understood to mean a material that does not significantly resist deformation when folded and tends to retain the folded shape. Examples of semi-rigid materials include thin mil cardboard used for cereal boxes, and thick mil paper used for brown paper grocery bags.

Figure 1:
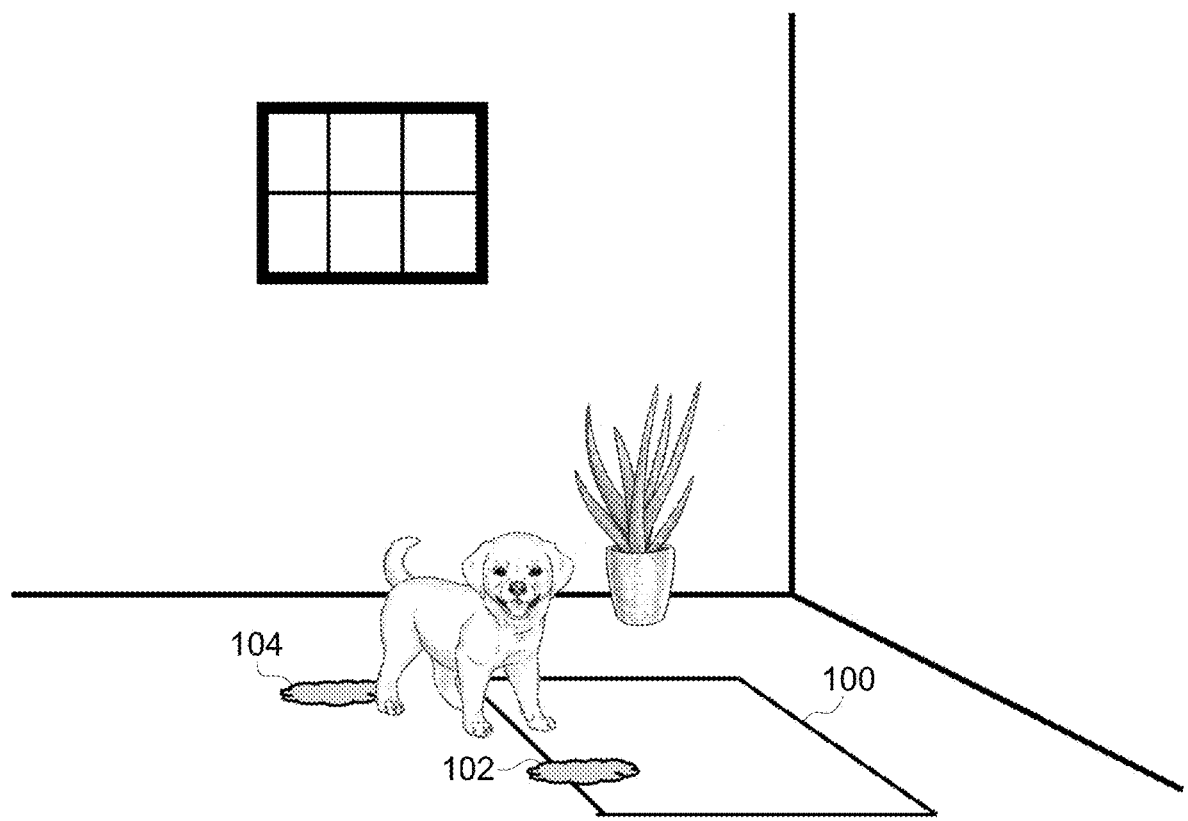
FIG. 1 illustrates a prior art pet pad.
Figure 2:
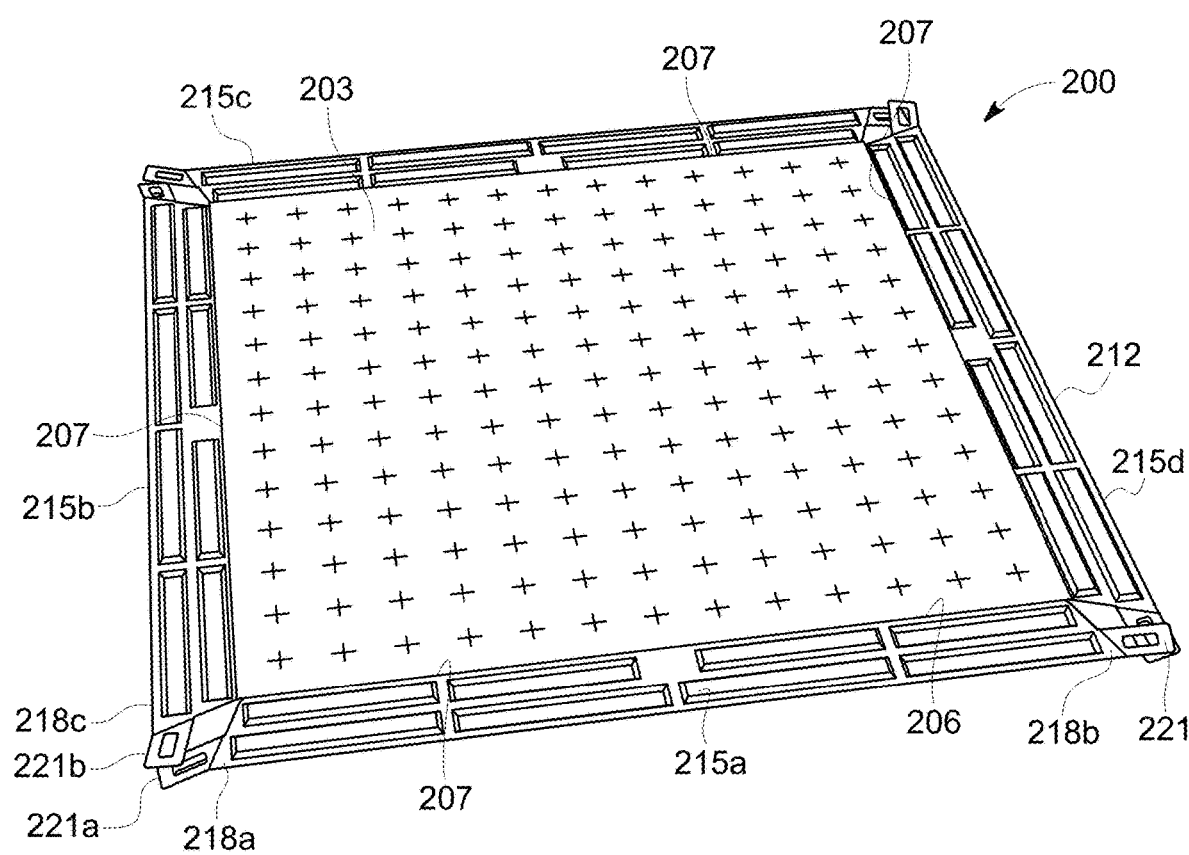
FIG. 2 is a perspective view of an exemplary pet pad consistent with the present invention.

Turning to the figures, FIG. 2 is a perspective view of an exemplary version of the inventive pet pad. Pad 200 comprises a non-rigid central region 203. In this exemplary version, central region 203 comprises non-rigid liquid-absorbing absorbent material. Central region 203 comprises perimeter 206 which surrounds the lateral extent of central region 203. Perimeter 206 generally defines a fold line 207 which is substantially where edges will be folded up to an erected angle, as described in more detail below.

In this exemplary embodiment an edge region 212 extends entirely around central region 203, including all four sides in the exemplary version illustrated. Edge region 212 comprises four edge sections 215*a*, 215*b*, 215*c*, and 215*d*. Each edge section 215*a*-*d* comprises two edge ends, such as edge ends 218*a* and 218*b* with respect to edge section 215*a*.

Edge attachment features are disposed at the edge ends, as illustrated by edge attachment feature 221*a* extending from edge end 218*a* and edge attachment feature 221*b* extending from edge end 218*c*. The configuration and function of the edge attachment features are described in more detail below with reference to FIG. 8.

Figure 3:
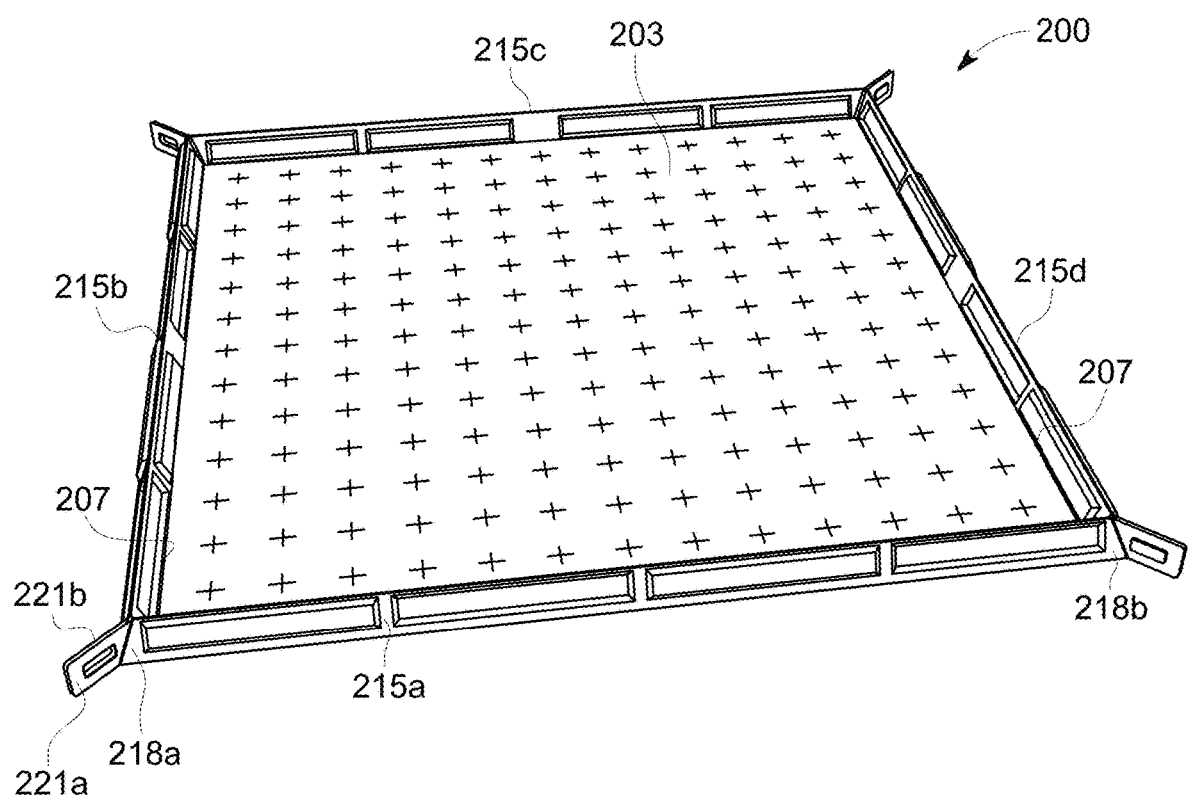
FIG. 3 is a perspective view of an exemplary pet pad with erected edge sections consistent with the present invention.

Turning to FIG. 3, FIG. 3 is a perspective view of an exemplary embodiment of the pet pad 200 consistent with the present invention illustrating the edge sections 215*a*-*d* each erected at fold line 207. In the illustrated embodiment, as described in more detail below with reference to FIGS. 5 and 6, each edge section is folded when erected forming a rigid double layer wall. In the illustrated embodiment, as described in more detail below with reference to FIG. 8, the erected state of edge sections 215*a*-*d* is maintained by coupling opposing edge attachment features, for example edge attachment features 221*a* and 221*b*.

Figure 4:
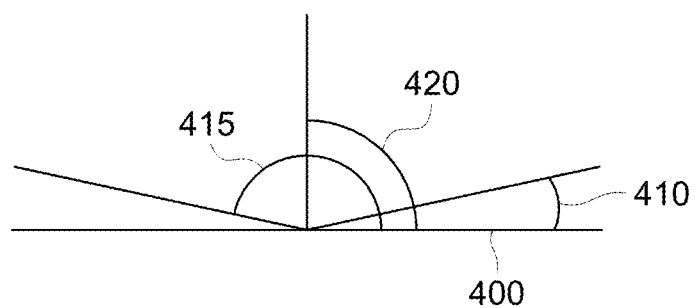
FIG. 4 illustrates the erected angles of exemplary versions of the inventive pet pad.

Turning to FIG. 4, FIG. 4 illustrates the erected angles of exemplary versions of the inventive pet pad. Pet pad 200 (FIG. 2) lies substantially in horizontal plane 400. In the exemplary version, when edge sections 215*a*-*d* of edge region 212 (FIG. 2) are folded upward to establish a lifted border surrounding pad 200, they may each be folded to an angle between and including 15 degrees, angle 410, and 165 degrees, angle 415. The folded angle may be referred to as the erected angle. The erected angle, in the illustrated version, is preferably substantially 90 degrees, angle 420.

Figure 5:
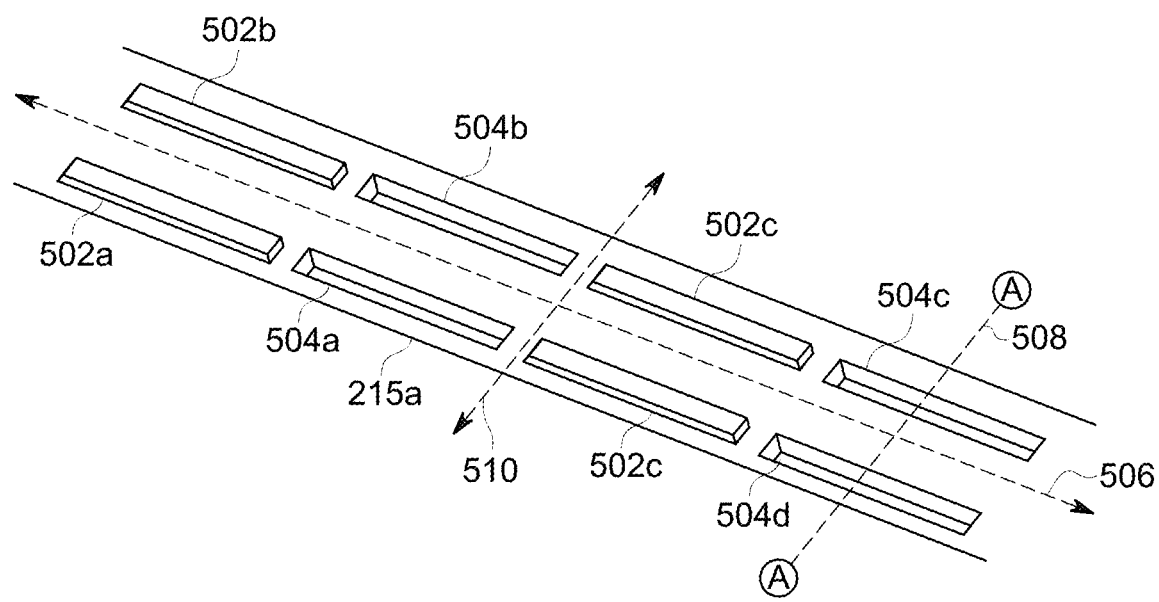
FIG. 5 illustrates detail of an exemplary pet pad edge section consistent with the present invention.

Turning to FIG. 5, FIG. 5 is a perspective detailed view of edge section 215*a*. In the exemplary embodiment shown, edge section 215*a* may comprise a molded pulp material (or similar paper or fiber derivative material which allows for the formation of three-dimensional features and/or hollow protrusions in the surface) which can be pressed to create three-dimensional surface features. In the illustrated embodiment, rectangular hollow "waffle-shaped" protrusions 502*a*, 502*b*, 502*c* and 502*d* are formed extending upwardly in a direction perpendicular to horizontal plane 400 (FIG. 4). Additionally, rectangular hollow waffle-shaped protrusions 504*a*, 504*b*, 504*c* and 504*d* are formed extending downwardly in the opposite direction perpendicular to horizontal plane 400.

Dotted arrow 506 in FIG. 5 denotes the central line edge section length of edge section 215*a*. In the exemplary embodiment edge section 215*a* is folded along edge section length 506 to configure edge section 215*a* into its erected state, the state shown in FIG. 3.

Figure 6:
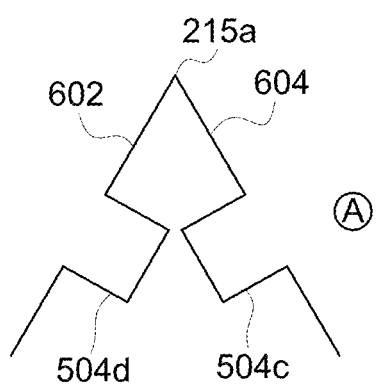
FIG. 6 is a cross section of an exemplary pet pad edge section consistent with the present invention.

Dotted line 508 marked (A)-(A) shown in FIG. 5 identifies the cross section further illustrated in FIG. 6. Turning to FIG. 6, FIG. 6 is a cross section of erected edge section 215*a* taken at dotted line 508 shown in FIG. 5. FIG. 6 illustrates, with respect to this exemplary embodiment, that folding edge section 215*a* along edge section length 508 (FIG. 5) establishes a double layer edge section comprised of a first layer 602 and a second layer 604. This double layer configuration supports substantial rigidity of the erected edge sections. Furthermore, in the illustrated embodiment, in this folded state protrusions 504*d* and 504*c* contact one another establishing the A-shaped of the cross section which further enhances the rigidity of erected edge section 215*a*.

Figure 7:
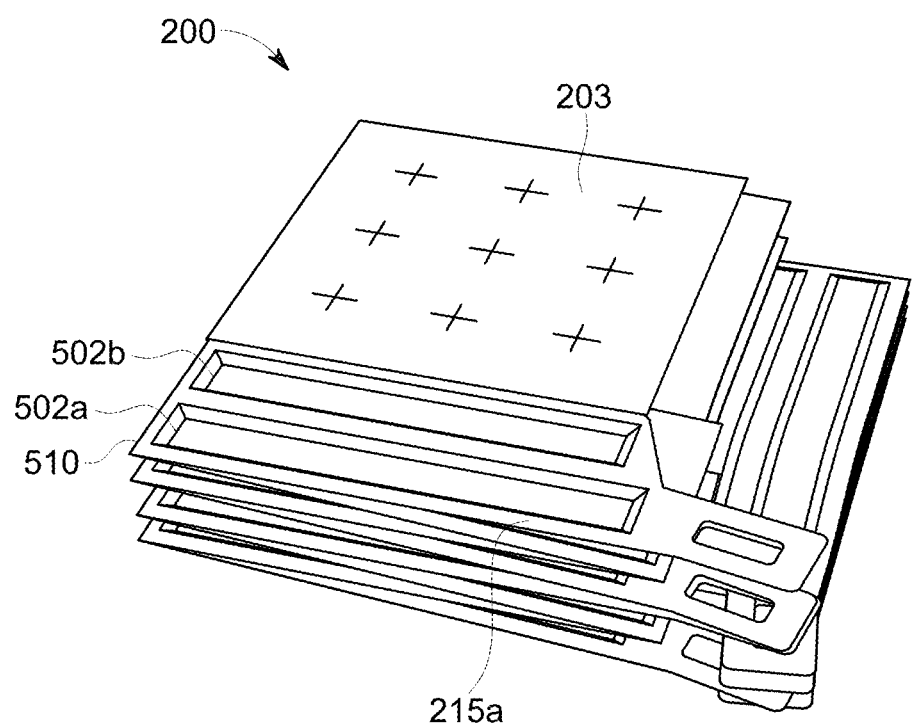
FIG. 7 illustrates an exemplary pet pad folded for packaging, shipping, and storage consistent with the present invention.

Returning to FIG. 5, dotted arrow 510 denotes a short direction fold line at which edge section 215*a* may be folded for packaging and shipping. More specifically, referring to FIG. 7, FIG. 7 illustrates and exemplary folded configuration wherein pet pad 200 is folded into quarters for efficient packaging, shipping and storage. The folding into quarters involves folding each edge section at a short direction fold line such as fold line 510 with respect to edge section 215*a*. Significantly, when folded the waffle shaped hollow protrusions including protrusions 502*a*-*d* and 504*a*-*d* nest within one another, one protrusion receiving a corresponding protrusion. This reduces the volume of ped pad 200 when folded for shipping and storage, and also preserves the shape of the protrusions when packaged for shipping and storage. For example, returning to FIG. 5, it will be appreciated that when edge section 215*a* is folded along line 510, protrusion 502*a* nests inside protrusion 504*d*, and similarly protrusion pairs 502*d*/504*a*, 502*b*/504*c* and 502*c*/504*b* nest as well.

Figure 8:
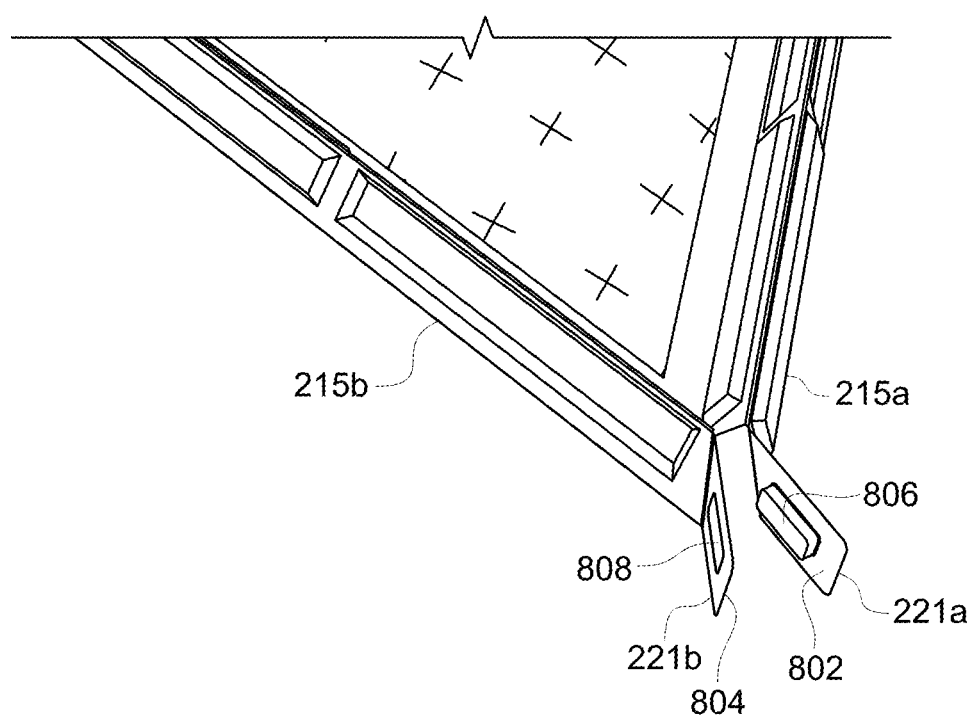
FIG. 8 illustrates detail of edge section edge attachment features consistent with the present invention.

An additional inventive aspect of certain embodiments of the present invention is illustrated in FIG. 8. FIG. 8 is a perspective detailed view illustrating the configuration and function of edge attachment features 221*a* and 221*b*. As previously discussed, edge attachment features 221*a* and 221*b* couple to maintain the erected state of the edge sections. More specifically, edge attachment features 221*a* and 221b comprise tabs 802 and 804, respectively. In the illustrated embodiment, edge sections 215a and 215b, including tabs 802 and 804 may comprise molded pulp material (or similar paper or fiber derivative material which allows for the formation of three-dimensional features and/or hollow protrusions in the surface) in which three-dimensional features may be pressed. In the illustrated embodiment, protrusion 806 is formed in tab 802. Opposing tab 804 of edge attachment feature 221b comprises an opening 808 shaped to substantially fixedly receive protrusion 806. More specifically, in the exemplary embodiment opening 808 is slightly smaller in dimensions than the outside dimensions of protrusion 806. Consequently, when protrusion 806 is pushed through opening 808 it tends to stay in place in a press-fit fashion. This coupling of opposing end attachment features maintains the edge sections in their erected state.

Figure 9:
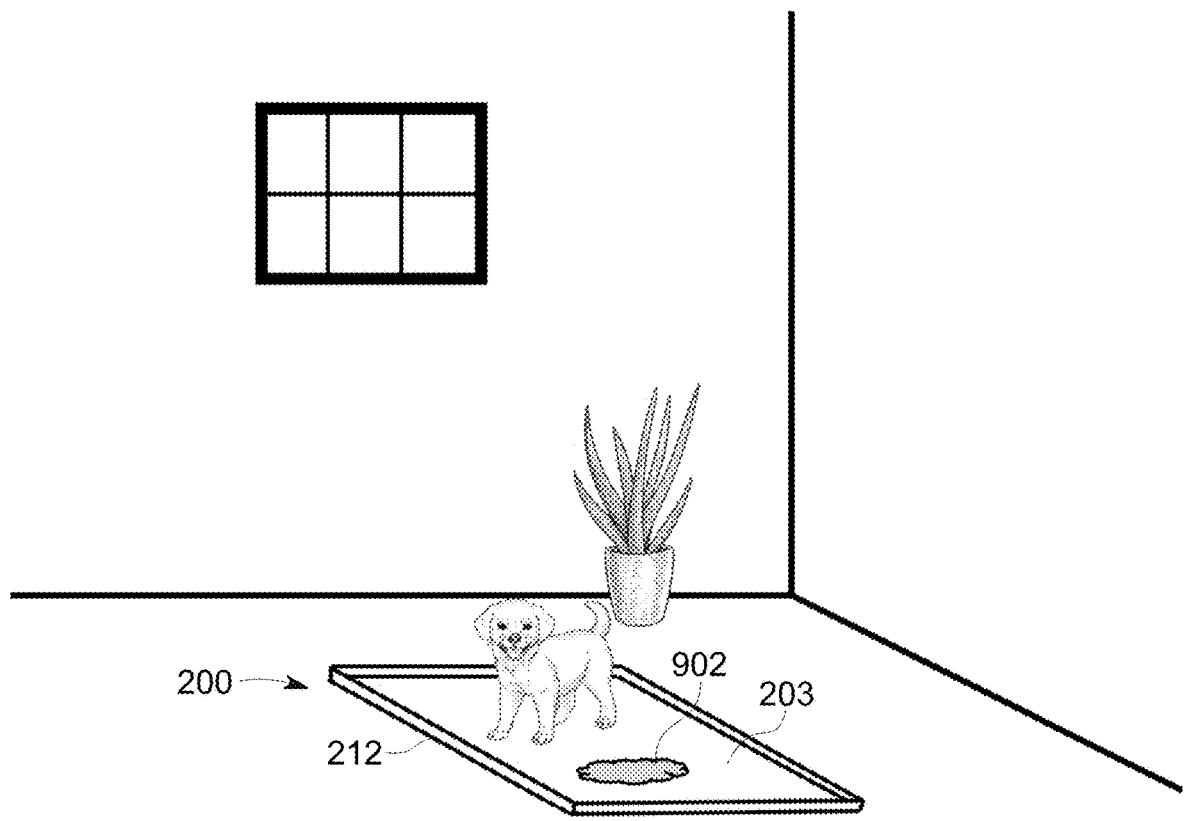
FIG. 9 illustrates an exemplary version of the inventive pet pad deployed in an exemplary use environment.

Turning to FIG. 9, FIG. 9 illustrates an exemplary version of the inventive pet pad deployed in an exemplary use environment. More specifically, FIG. 9 illustrates edge region 212 in its erected angle position, forming a substantially vertical border surrounding pad 203. Thus, an innovated pet pad is provided that may be packaged, shipped and stored as a compact article. And when the pad is deployed, its edges can be erected in an especially rigid configuration to support retaining pet waste 902 on the pad, and to provide a three-dimensional border attracting a pet to situate itself entirely on the pad when producing waste.

The foregoing description of exemplary embodiments of the invention has been presented for the purpose of illustration; it is not intended to be exhaustive or to limit the invention to the precise forms disclosed. The description and drawings are, accordingly, to be regarded in an illustrative rather than a restrictive sense. The language used in the specification has been principally selected for readability and instructional purposes. It is therefore intended that the scope of the invention be limited not by this detailed description and drawings, but rather by any claims that issue based on this disclosure. It will be evident that various modifications and changes may be made thereto without departing from the broader spirit and scope of the invention as set forth in the claims.

What is claimed is:

1. A pet pad comprising:
    a non-rigid central region comprising an absorbent material, the central region disposed in a first horizontal plane;
    an edge region substantially disposed in the first horizontal plane, extending laterally away from the central region, the edge region comprising a plurality of edge sections, the plurality of edge sections configured to fold away from the first horizontal plane forming an erected angle between 15 degrees and 165 degrees with the first horizontal plane; and
    at least one of the edge sections comprising an edge section length and configured to be folded along the edge section length to establish a double layer edge section when erected,
    wherein the at least one of the edge sections comprises a short fold line that is perpendicular to the edge section length in the first horizontal plane, a first edge section protrusion protruding upward perpendicular to the first horizontal plane and a second edge section protrusion protruding downward perpendicular to the first horizontal plane, and the first edge section protrusion and the second edge section protrusion are configured to be coupled to each other when the at least one of the edge sections is folded along the short fold line.

2. The pet pad of claim 1, the double layer edge section having an A-shaped cross section.

3. The pet pad of claim 1, wherein the plurality of edge sections comprise molded pulp material.

4. The pet pad of claim 1, wherein the double layer edge section has an A-shaped cross section, and the at least one of the edge sections further comprises a third edge section protrusion protruding downward with regard to the first horizontal plane such that when folded into the A-shaped cross section, the second edge section protrusion and the third edge section protrusion come into contact thereby facilitating maintaining the A-shaped cross section.

5. The pet pad of claim 1, each of the edge sections comprising an edge attachment feature and wherein at least one of the edge attachment features comprises a first tab comprising a first attachment protrusion and an opposing edge attachment feature comprises a second tab comprising an opening shaped to substantially fixedly receive the first attachment protrusion.

6. The pet pad of claim 5, wherein the first tab comprises molded pulp material and the first attachment protrusion comprises a hollow shape formed in the molded pulp material.

7. The pet pad of claim 1, wherein a first one of the edge sections comprises a first protrusion having a hollow shape, the first protrusion extending in a first direction perpendicular to the first horizontal plane, the first one of the edge sections further comprising a second protrusion extending in a second direction opposite the first direction, and wherein the first one of the edge sections is configured to fold and when folded the hollow shape of the first protrusion receives the second protrusion.

8. A pet pad comprising:
    a non-rigid central region comprising an absorbent material, the central region disposed in a first horizontal plane;
    an edge region substantially disposed in the first horizontal plane extending laterally away from the central region, the edge region comprising a plurality of edge sections, the plurality of edge sections configured to fold away from the first horizontal plane forming an erected angle between 15 degrees and 165 degrees with the first horizontal plane, each of the edge sections comprising a section end attachment feature; and
    at least one of the edge sections comprising an edge section length, the at least one of the edge sections configured to be folded along the edge section length to establish a double layer edge section when erected, the double layer edge section being maintained as a double layer by coupling of opposing section end attachment features,
    wherein the at least one of the edge sections comprises a short fold line that is perpendicular to the edge section length in the first horizontal plane, a first edge section protrusion protruding upward perpendicular to the first horizontal plane and a second edge section protrusion protruding downward perpendicular to the first horizontal plane, and the first edge section protrusion and the second edge section protrusion are configured to be coupled to each other when the at least one of the edge sections is folded along the short fold line.

9. The pet pad of claim 8, wherein the double layer edge section has an A-shaped cross section.

10. The pet pad of claim 8, wherein the plurality of edge sections comprise molded pulp material.

11. The pet pad of claim 8, wherein the double layer edge section having an A-shaped cross section, and the at least one of the edge sections further comprises a third edge section protrusion protruding downward with regard to the first horizontal plane such that when folded into the A-shaped cross section, the second edge section protrusion and the third edge section protrusion come into contact thereby facilitating maintaining the A-shaped cross section.

12. The pet pad of claim 8, wherein the opposing section end attachment features comprises a first tab comprising a first attachment protrusion and a second tab comprising an opening configured to receive the first attachment protrusion.

13. The pet pad of claim 12, wherein the first tab comprises molded pulp material and the first attachment protrusion comprises a hollow shape defined in the molded pulp material.

14. The pet pad of claim 8, wherein a first one of the edge sections comprises a first protrusion having a hollow shape, the first protrusion extending in a first direction perpendicular to the first horizontal plane, the first one of the edge sections further comprising a second protrusion extending in a second direction opposite the first direction, and wherein the first one of the edge sections is configured to fold and when folded the hollow shape of the first protrusion is configured to receive the second protrusion.

15. A pet pad comprising:
   a non-rigid central region comprising an absorbent material, the central region disposed in a first horizontal plane;
   an edge region substantially disposed in the first horizontal plane, the edge region extending laterally away from the central region, the edge region comprising a plurality of edge sections, the plurality of edge sections configured to fold away from the first horizontal plane forming an erected angle between 15 degrees and 165 degrees with the first horizontal plane, each of the edge sections comprising a section end attachment feature; and
   wherein a first one of the section end attachment features comprises a first tab comprising a first attachment protrusion and a second one of the section end attachment features comprises a second tab, the second tab comprising an opening shaped to substantially fixedly receive the first attachment protrusion,
   wherein at least one of the edge sections comprises an edge section length and is foldable along the edge section length to establish a double layer edge section when erected, and
   wherein the double layer edge section has an A-shaped cross section, and the at least one of the edge sections further comprises a first edge section protrusion protruding downward perpendicular to the first horizontal plane and a second edge section protrusion protruding downward perpendicular to the first horizontal plane such that the first edge section protrusion and the second edge section protrusion come into contact when the at least one of the edge sections is folded, thereby facilitating maintaining the A-shaped cross section.

16. The pet pad of claim 15, wherein the first tab comprises molded pulp material and the first attachment protrusion comprises a hollow shape defined in the molded pulp material.

* * * * *